(12) United States Patent
Wang et al.

(10) Patent No.: US 10,082,952 B2
(45) Date of Patent: Sep. 25, 2018

(54) SYSTEM AND METHOD FOR TEXT INPUT BY A CONTINUOUS SLIDING OPERATION

(71) Applicant: Shanghai Chule (CooTek) Information Technology Co. Ltd., Shanghai (CN)

(72) Inventors: Jialiang Wang, Shanghai (CN); Kan Zhang, Shanghai (CN); Lin Zou, Shanghai (CN)

(73) Assignee: SHANGHAI CHULE (COOTEK) INFORMATION TECHNOLOGY CO. LTD., Shanghai (CN)

( * ) Notice: Subject to any disclaimer, the term of this patent is extended or adjusted under 35 U.S.C. 154(b) by 726 days.

(21) Appl. No.: 14/598,058

(22) Filed: Jan. 15, 2015

(65) Prior Publication Data

US 2016/0004433 A1    Jan. 7, 2016

(30) Foreign Application Priority Data

Nov. 15, 2013   (CN) .......................... 2013 1 0574003

(51) Int. Cl.
*G06F 3/048* (2013.01)
*G06F 3/0488* (2013.01)
*G06F 17/30* (2006.01)

(52) U.S. Cl.
CPC ...... *G06F 3/04886* (2013.01); *G06F 3/04883* (2013.01); *G06F 17/30699* (2013.01)

(58) Field of Classification Search
CPC ... G06F 3/0488; G06F 3/0489; G06F 3/04886
See application file for complete search history.

(56) References Cited

U.S. PATENT DOCUMENTS

| 5,742,705 A * | 4/1998 | Parthasarathy ...... G06K 9/6857 382/185 |
| 2007/0040813 A1* | 2/2007 | Kushler ................ G06F 3/0237 345/173 |

(Continued)

FOREIGN PATENT DOCUMENTS

| CN | 102736821 A | 10/2012 |
| CN | 102736825 A | 10/2012 |

*Primary Examiner* — Ryan F Pitaro
(74) *Attorney, Agent, or Firm* — Novick, Kim & Lee, PLLC; Allen Xue

(57) ABSTRACT

A method and system for text input by a continuous sliding operation is provided. Said method comprises: detecting a movement trajectory of a sensing apparatus, recording input information, and obtaining feature information from said input information, wherein said feature information includes at least one of angle information and movement trajectory length; searching a feature lexicon according to said feature information, and selecting words that satisfying condition that the angle information is matched or the movement trajectory length is matched, as matched words so as to obtain a rough screened word set; calculating a distance between the actual movement trajectory of each word and its corresponding first standard trajectory, so as to obtain a rough filtered word set; calculating a similarity between the actual movement trajectory of each word in the rough filtered word set and its corresponding second standard trajectory, and sequencing said words according to the similarity, and then outputting said words.

17 Claims, 7 Drawing Sheets

(56) References Cited

U.S. PATENT DOCUMENTS

| | | | |
|---|---|---|---|
| 2011/0193797 A1* | 8/2011 | Unruh | G06F 3/0237 |
| | | | 345/173 |
| 2013/0311956 A1* | 11/2013 | Li | G06F 3/017 |
| | | | 715/863 |
| 2014/0115522 A1* | 4/2014 | Kataoka | G06F 3/017 |
| | | | 715/773 |
| 2014/0189569 A1* | 7/2014 | Eleftheriou | G06F 3/0233 |
| | | | 715/773 |

* cited by examiner

SYSTEM AND METHOD FOR TEXT INPUT BY A CONTINUOUS SLIDING OPERATION

CROSS-REFERENCE TO RELATED PATENT APPLICATION

This application claims priority to Chinese Patent Application No. 201310574003.1 filed on Nov. 15, 2013, the disclosure of which is incorporated herein in its entirety by reference.

FIELD OF THE INVENTION

This invention relates to the field of the inputting control of electronic equipments, and especially to the technical field of inputting information on a touch screen of electronic equipment; and more specifically, this invention relates to a method and system for text input by a continuous sliding operation base on a software keyboard on electronic equipment.

DESCRIPTION OF THE RELATED ART

In modern life, with the continuous development of integrated circuit technology, there have been developed all kinds of electronic equipments equipped with touch screen. All those electronic equipments equipped with touch screen (e.g. palm computer, smart phone, embedded system, pocket computer and the like) may not be able to be equipped with a complete hardware keyboard due to the limitation of factors such as size and manufacturing cost, and input into such equipments is thus usually realize by software simulation.

Usually, as for equipments equipped with a touch screen of small size, the input operation is mostly realized by a software keyboard. The user selects contents to be inputted by pressing and tapping on keys of the software keyboard, thus realizing the inputting operation. In prior art, conventional software keyboard brings huge inconvenience to the user. The main reasons are that the size of the touch screen is small and contents available for choice are many, thus, the size of a corresponding selection area on the screen is also small. Accordingly, the user cannot perform inputting operation by accurately tapping the selection area on the screen directly by a finger, and a tool with smaller contact resolution such as stylus pen is often needed. Thus, in most cases, the user is required to use his/her both hands to perform operation: one hand holds such electronic equipment, while the other hand uses a stylus pen to tap the touch screen to input. In this way, not only the operation is inconvenient, but also the user may still be unable to accurately realize the input because of various misoperations such as incorrect tapping a key, caused by all kinds of reasons, in some situations such as running cars or other bumpy environments.

Sliding input is another way to input words on the touch screen. The user inputs an expected word by sequentially sliding across positions at which respective letters of such word is located on a software keyboard. Theoretically, the user's finger or a stylus pen has no need to leave the touch screen, so that the sliding speed may be faster than the tapping speed, and thus the input operation is more convenient.

However, in practice, the existing sliding input technologies usually search for a corresponding letter according to the coordinate of a critical point that appears during the user's sliding operation. When an area of a region of the sensing apparatus occupied by a key is large, the screen efficiency is high, and the requirement on the abilities of subsequent computing and processing is low. However, as the terminal device become smaller and smaller, the size of the software keyboard provided on the terminal device become smaller accordingly; correspondingly, an area of a region of the sensing apparatus occupied by respective key becomes smaller, which make the possibility that the user would make error press operation or the system would make error recognition or misjudgment increase significantly. Under such situation, when the screening is conducted by the coordinate of the critical point, since the sliding input procedure is highly affected by input habit of the user and other factors, the possibility of misjudgment is unexpectedly high, which make the accuracy of prediction far from high enough.

Referring to FIG. 1 to FIG. 3, since different users have different input habits, for example, the user may use the trajectory shown in FIG. 1 to input a word "kate", and may also use the trajectory shown in FIG. 2 to sequentially slide across letters "k", "a", "t" and "e"; also, during the input operation, a key may be pressed by error or by mistake, for example, as shown in FIG. 3, when the user slides across the letter "t", the sliding operation may mistakenly enter into a region corresponding to a letter "y" adjacent to the letter "t", and also other error press operations or mistaken press operations may happen. Currently, the common sliding input method usually detects turning points in the sliding trajectory, as the critical points, and searches the feature lexicon for corresponding candidate words according to the critical points. However, the inventor of the present invent found out that, during the process of text input by a continuous sliding operation, due to the existence of above-mentioned unexpected situations or due to the existence of different input habits of the user, during detecting the turning points of the sliding trajectory, some turning points are easy to be missed or be falsely added or be mistakenly judged, all of which will impact the accuracy of the search results, and will increase the burden on data computation and thus add the hardware burden.

Further, when the searched is conducted by the coordinate of the critical point, the amount of data to be computed is huge, and the complexity of the computation is high. Although it is possible to realize the computation process by means of a CPU with higher computation ability, the huge amount of data computation will always consume a lot of electricity energy; then, in case that the battery capacity is limited, the usage sustainability of electronic equipment will be significantly limited. Furthermore, the prior art usually need draw a complete trajectory of a word in order to finish the computation, thus as for some long words, it is difficult for the user to draw a complete and correct trajectory.

SUMMARY OF THE INVENTION

An object of the present invention is to overcome defects of the prior art, and to provide a sliding input system and method that are more accurate, faster and more convenient.

According to one aspect of the present invention, the present invention provides a method for text input by a continuous sliding operation, comprises: detecting a movement trajectory of a sensing apparatus, recording input information, and obtaining feature information from said input information, wherein said feature information includes at least one of angle information and movement trajectory length; searching a feature lexicon according to said feature information, and selecting words that satisfying at least one of the following conditions as matched words so as to obtain a rough screened word set, wherein said conditions are: their angle information is matched with the angle information in said feature information, or their movement trajectory length is matched with the movement trajectory length in said feature information; according to the actual movement trajectory of each word in said rough screened word set, calculating a distance between such actual movement trajectory and a first standard trajectory corresponding to said word, and filtering the words according said distance so as to obtain a rough filtered word set; and calculating a similarity between the actual movement trajectory of each word in the rough filtered word set and its corresponding second standard trajectory, and sequencing said words according to the similarity, and outputting said words to the user according such sequencing.

According to another aspect of the present invention, the present invention provides a system for text input by a continuous sliding operation comprising: an input module, suitable for receiving sliding inputs of the sensing apparatus; an output module, suitable for feeding output results back to the user; an input information recording module, suitable for detecting the inputs of the sensing apparatus and recording the input information; a feature information obtaining module, suitable for obtaining feature information containing at least one of the angle information and the actual movement trajectory length, from the recorded input information; a rough screening module, suitable for searching the feature lexicon for matched words according to said feature information, so as to obtaining the rough screened word set; a rough filtering module, suitable for calculating with respect to each word of the rough screened word set, the distance between its actual movement trajectory and standard trajectory, filtering according to said distance so as to obtain a rough filtered word set; and a fine filtering module, suitable for calculating with respect to each word of the rough filtered word set, the similarity between its standard trajectory and the actual movement trajectory, and sequencing the words obtained by fine filtering, and outputting the words to the output module according to said sequencing.

According to yet another aspect of the present invention, the present invention also provides a system for text input by a continuous sliding operation comprising: an interactive apparatus, suitable for receiving sliding inputs of the user, detecting and recording the inputs of the user, and feeding input results back to the user; a processor, suitable for performing the following operations: searching a feature lexicon according to said feature information, and selecting words that satisfying at least one of the following conditions as matched words so as to obtain a rough screened word set, wherein said conditions are: their angle information is matched with the angle information in said feature information, or their movement trajectory length is matched with the movement trajectory length in said feature information; calculating with respect to the actual movement trajectory of each word of the rough screened word set, the distance between it and a first standard trajectory corresponding to said word, and filtering the words according to said distance so as to obtain a rough filtered word set; and calculating a similarity between the actual movement trajectory of each word in the rough filtered word set and its corresponding second standard trajectory, and sequencing said words according to the similarity, and outputting said words to the user according such sequencing.

Compared with the prior art, the present invention provides method and system for text input by a continuous sliding operation based on a software keyboard on electronic equipment. Wherein, the interactive apparatus record the input information inputted by the user's sliding operation and delivers it to the processor, and the processor rapidly filters out a rough screened word set containing hundreds or thousands of possible, similar words from the feature lexicon, according to the feature information such as the angle information, the actual trajectory length and the like in the input information. Then, position information is used to further filter the rough screened word set, so as to obtain a rough filtered word set. On this basis, the similarity between the actual movement trajectory of each word and its standard trajectory is calculated, and calculation is made by weighting in connection with a priority level of the word, environmental word information of the word, the input history information of the word and the fact about whether the word is a expected result and the like; the candidate words are sequenced according to the calculating result, and then are outputted to the interactive apparatus, so as to be fed back to the user. Thus, by utilizing various features obtained during the sliding process, while the speed is guaranteed, harmful effects that may be brought by the user's misoperations and system's misjudgment is effectively diminished, the speed and accuracy of the input of word is significantly improved, complexity of the user's operation is obviously reduced, the implementation procedure is simple, the application is convenient and fast, the working performance is stable and reliable, and the scope of application is broad; thus, scale application of the method of inputting information on a touch screen of an electronic equipment is greatly promoted, which brings great convenience to people's work and life.

DETAILED DESCRIPTION OF THE PREFERRED EMBODIMENTS

Before embodiments of the present invention are described in detail, it should be noted that, said embodiments are mainly about a combination of steps of a method and a combination of components of equipment for inputting texts into electronic equipment. Thus, said equipment components and method steps have been shown in the Figures by regular signs at suitable positions, and only details that is useful in understanding embodiments of the present invention are shown, so that contents disclosed here won't get blurred because of some details that is obvious to a person skilled in the art that benefits from the present invention.

In the Description, relationship terms such as "left" and "right", "up" and "down", "front" and "back", "first" and "second", are only used to discriminate an entity or action from another entity or action, and do not necessarily require or imply any substantial relationship or sequence of such entities or actions. Terms "comprising", "including" or any other variants mean to cover an inclusive meaning inclusion, thus a process, a method, a product or an equipment comprising a series of elements not only includes those elements, and also includes other elements that are not specifically listed, or some inherent element that such process, method, product or equipment has.

For purpose of this disclosure, term "keyboard" is defined in a broad sense, including any input component having determined region, which includes but is not limited to mechanical hardware keyboard, induction type hardware keyboard, software keyboard on a touch screen and the like. By default, embodiments of the present invention make explanations by using the software keyboard on the touch screen as example. However, a person skilled in the art may understand that, the methods and equipments mentioned in the present invention may also be applied to hardware keyboards.

Figure 4:
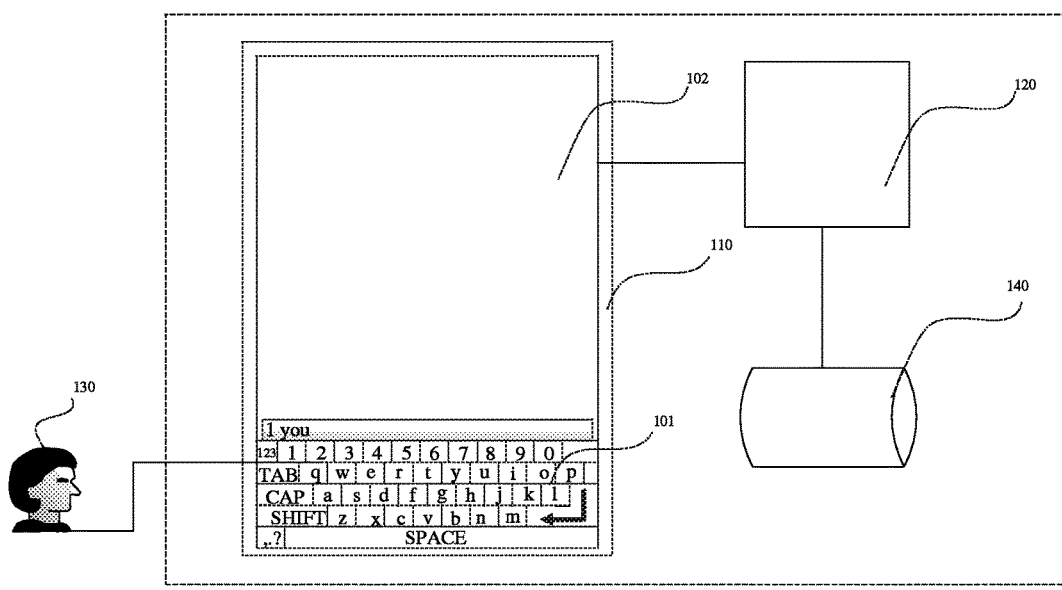
FIG. 4 is a structural diagram of an embodiment of a system for text input by a continuous sliding operation of the present invention.

Referring to FIG. 4, an embodiment of a system for text input by a continuous sliding operation provided by the present invention, may at least comprises an interactive apparatus 110 and a processor 120. Wherein, the interactive apparatus 110 may comprise the keyboard 101 and a text display area 102 that are arranged on a mobile communication terminal device, for example a touch screen equipped with a software keyboard. The processor 120 may be a CPU or an ASIC chip. After the user performs input operation by the keyboard 101, the input information is processed by means of the processor 120, and the processed text is displayed in the text display area 102, so as to be fed back to the user.

The keyboard 101 can be a software keyboard, and its keyboard layout can apply the single-key keyboard layout of QWERTY, which includes 26 English letters, numbers, signs and space key, and each key represents one letter, one number or one sign that may correspond to the same key together with a letter. The single-key keyboard layout of AZERTY may also be employed. In other embodiments, the keyboard 101 may also use other keyboard layout, or may be adapted for other languages other than English. Moreover, specific contents and positions of the letters, numbers and signs may vary according to requirements of specific language or arrangement of the keyboard.

On some different mobile communication terminal devices, the keyboard 101 and the text display area 102 may be integrated into one interactive apparatus, and may also respectively be arranged on individual interactive apparatuses. When the keyboard 101 and the text display area 102 are integrated into one interactive apparatus, the keyboard 101 may pop out or retract according to requirements, so that a text display area 102 is variable of size; and also, the size of the keyboard 101 may be adjusted.

Figure 1:
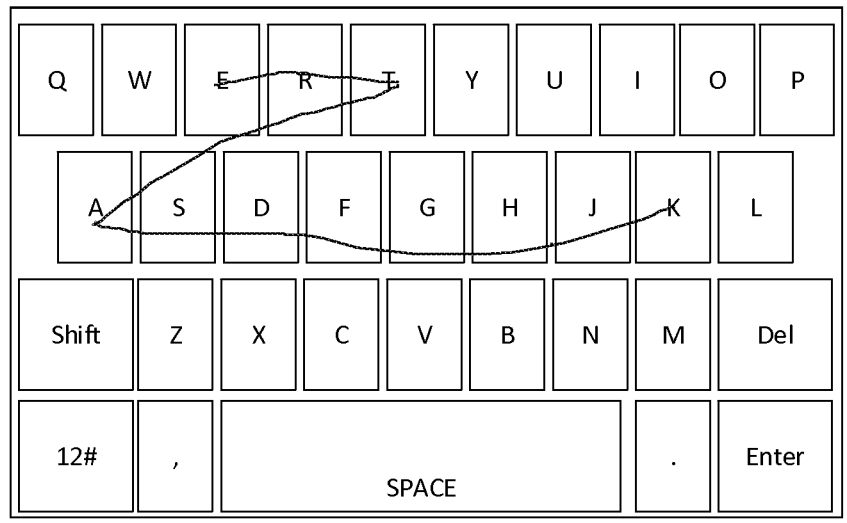
FIG. 1 to FIG. 3 are schematic diagrams for explaining the implementing of inputting the word "kate" by a continuous sliding operation via a software keyboard on an electronic equipment.
Figure 2:
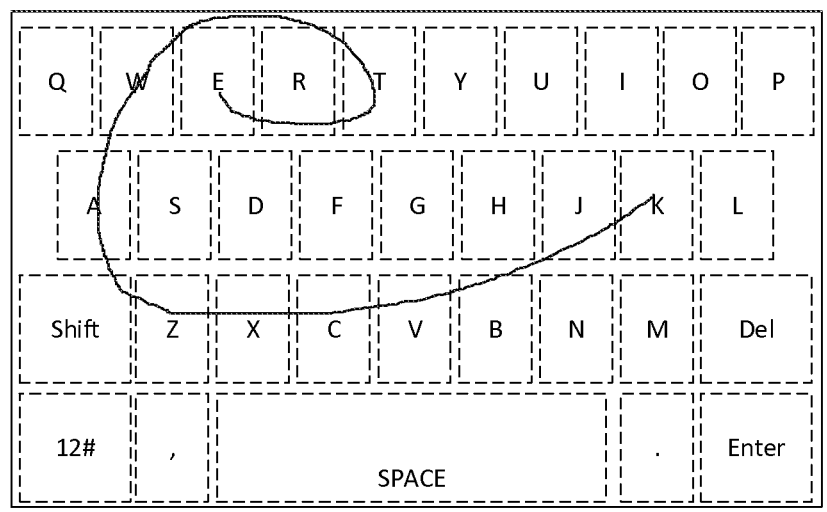
Figure 3:
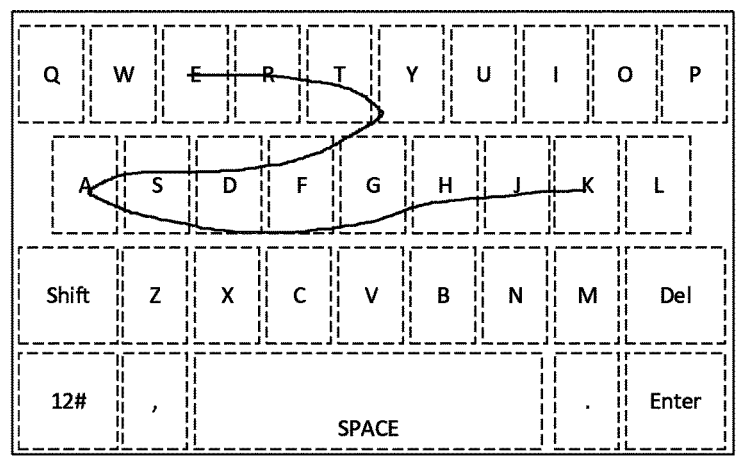

During the process for text input by a continuous sliding operation, for example, referring to FIG. 1, the user uses the sensing apparatus 130 such as a finger, a stylus pen and the like to sequentially slide across approximate regions of the letters "k", "a", "t" and "e" on the area of the keyboard 101; and the interactive apparatus 110 detects the action of the sensing apparatus 130, records the input information of the sensing apparatus 130, for example the stop location, the movement angle, the movement trajectory length and the like of the sensing apparatus 130, and obtains the movement trajectory of the sensing apparatus 130 from such input information. The interactive apparatus 110 delivers the recorded input information and movement trajectory to the processor 120; and the processor 120 further processes them, obtains a word set matched with the movement trajectory of the sensing apparatus 130 by performing searching, filtering, and matching operation in the feature lexicon, then further performs sequencing operation on the matched word set according determined order, and displays the sequencing result in the text display area 102, so as to feed back to the user.

Additionally, an embodiment of the system for text input by a continuous sliding operation provided by the present invention may also comprises a storage device 140 suitable for storing data that are produced or may probably produced in order to implement the method for text input by a continuous sliding operation, for example a feature lexicon, input information, movement trajectories and so on. The storage device 140 may be any storage medium, such as Random Access Memory (RAM), Read-Only Memory (ROM), Flash, hardware and so on.

Figure 5:
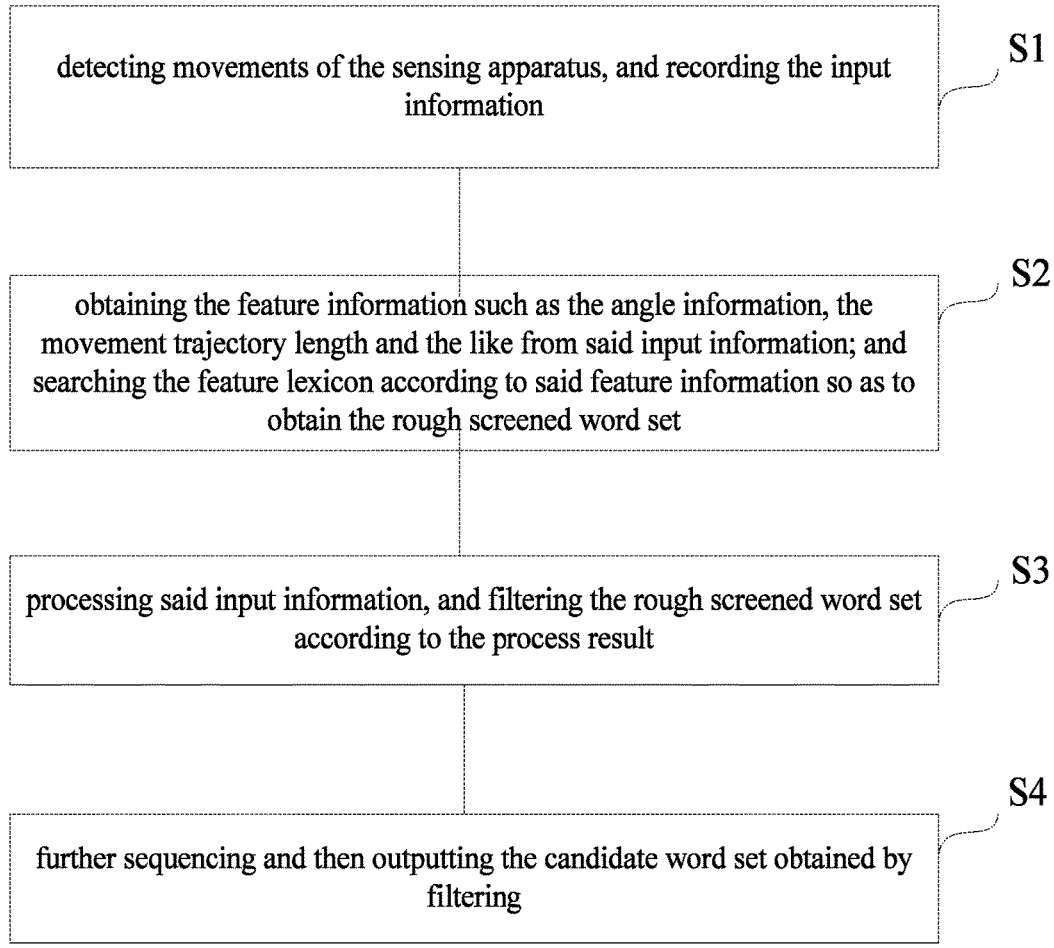
FIG. 5 is a flow diagram of an embodiment of a method for text input by a continuous sliding operation of the present invention.

Referring to FIG. 5, en embodiment of the method for text input by a continuous sliding operation of the present invention may comprise the following steps:

A step S1: detecting movements of the sensing apparatus, and recording the input information.

Figure 6:
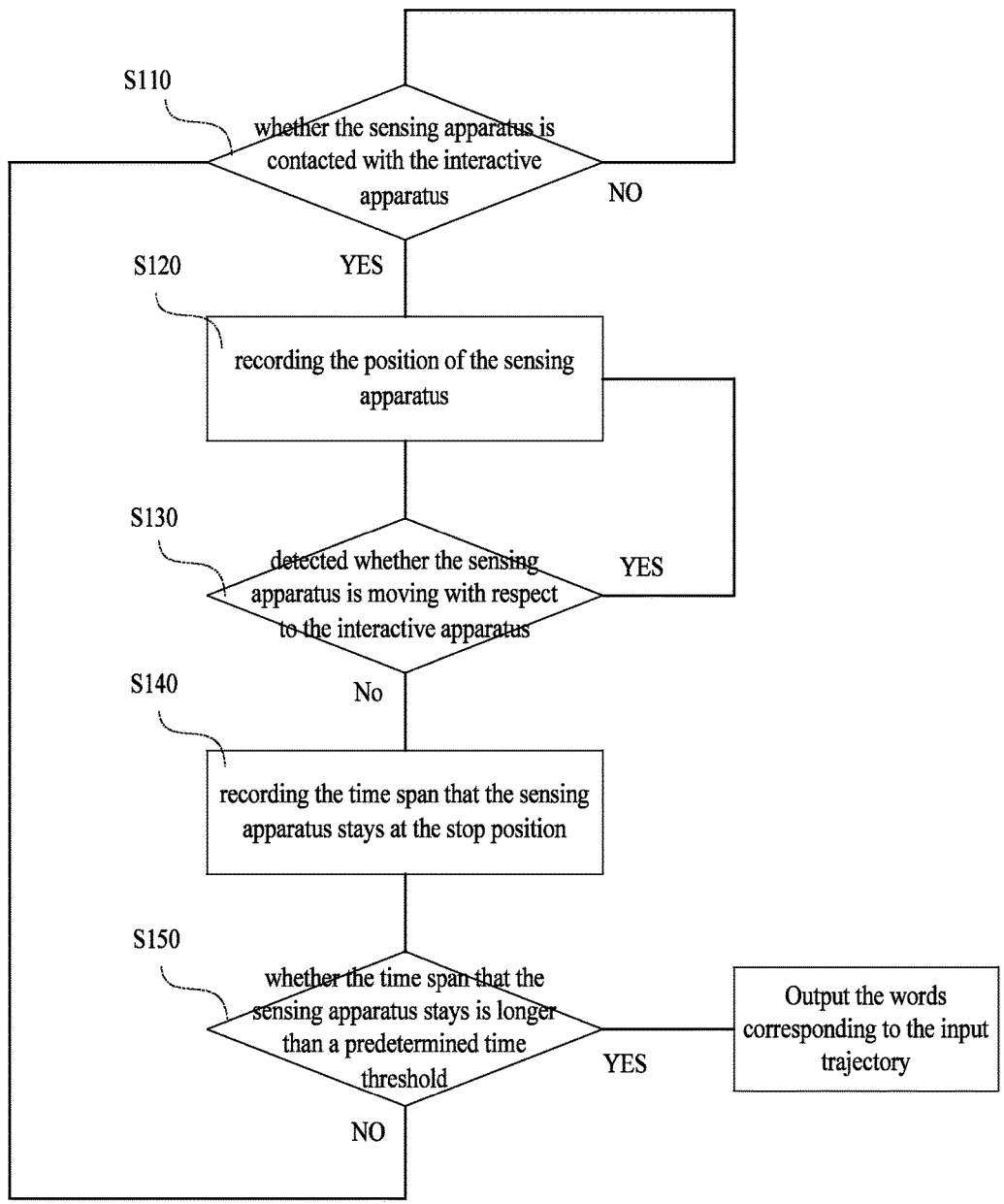
FIG. 6 is a flow diagram of an embodiment of the step S1 shown in FIG. 5.

Wherein, referring to FIG. 6, in one embodiment, first of all, the step S110 is performed, and it is detected whether the sensing apparatus is contacted with the interactive apparatus. When such contact exists, a step S120 is performed, so as to record the position of the sensing apparatus, and it is detected whether the sensing apparatus is moving in a step S130. When it is detected that the sensing apparatus is moving, the operation of recording the position of the sensing apparatus continues. When it is detected that the sensing apparatus stop moving, it is detected whether it stops contacting the interactive apparatus, its position is recorded and the time span that it stays at the stop position may also be recorded. Specifically, when the sensing apparatus keeps contacting the interactive apparatus after the sensing apparatus stops moving, it's possible that the user is thinking about the letter to be inputted next or the user is waiting for the words corresponding to the input trajectory to show up, and the step S140 can be performed at this time, wherein the time span that the sensing apparatus stays at the stop position is compared with a predetermined time threshold, in order to determine whether corresponding words should be outputted according information that has been inputted. For example, when the time span exceeds the predetermined time threshold, the step S150 is performed, so that words corresponding to the input trajectory are outputted. During above detecting process, when it is detected that the sensing apparatus stop contacting the interactive apparatus, a corresponding word set is obtained according to the input information, and the obtained word set is outputted to the user.

When the position of the sensing apparatus is recorded, it may comprise further recording angle information corresponding to its position, for example, calculating the gradient of individual position point, so as to obtain the angle information corresponding to the position; and it may comprise further recording actual movement trajectory length of the sensing apparatus, for example, according to the movement trajectory of the sensing apparatus, and summing up distances between every two successive positions to approximately calculate a length of the trajectory; and by means such as integrating, it's easy to extract the length of every sliding trajectory of the user.

In practical process, since noise points may be generated in the data of the sliding trajectory due to some reasons such as the fact that the hand trembles when the user is performing input operation, a series of pre-processing operations may be performed on the input information, and the pre-processed results may be recorded. For example, it may comprise eliminating the difference of sizes of the trajectories caused by the difference of sizes of cell phone touch screen, by means of size normalization; it may comprise eliminating the noise points in the data of the sliding trajectory caused by reasons such as hand trembling, by means of the trajectory smoothing process (for example smoothing the trajectory by means of mean filter and the like); it may also comprises processes such as normalizing dot pitches.

A step S2: obtaining the feature information such as the angle information, the movement trajectory length and the like from said input information; and searching the feature lexicon according to said feature information so as to obtain the rough screened word set.

In one embodiment, the input information recorded in the step S1 does not include the angle information, the movement trajectory length and the like. The step S2 calculates according to the recorded position information, so as to obtain corresponding feature information such as the angle information, the movement trajectory length and the like.

In a specific embodiment, an angle at the start position of the sensing apparatus may be calculated according to said input information, and words with matched start point angle are searched out from the lexicon. For example, when the user inputs the word "what" through a keyboard with qwerty layout, at the time when his/her finger slides from the first letter "w" to the second letter "h", the angle of its start position is the same with the angle of the start position got when the user inputs a word "snake". Thus, when the feature lexicon is searched according to the angle information of the start position, the word "snake" will also be added into the rough screened word set.

In another specific embodiment, the angle of the end position of the sensing apparatus can be calculated according to said input information, and words with matched end position the angle is searched out from the lexicon. For example, when the user inputs the word "insist" through a keyboard with azerty layout, at the time when his/her finger slides from the letter "s" to the last letter "t", a difference between its end position angle and the end position angle got when the user inputs "candy" is within predetermined threshold range. Thus, when the feature lexicon is searched according to the angle information of the end position, the word "candy" will also be added into the rough screened word set.

In another specific embodiment, the feature lexicon may be searched according to a combination of the angle information of the start position and the angle information of the end position, or the angle information of other specified position, or a combination of it and the angle information of the start position or the end position, so that the rough screened word set is obtained.

Wherein, a predetermined angle threshold range can be set, and when corresponding angle of a word in the feature lexicon is different from the actually inputted angle information no more than a predetermined angle threshold range, it is considered as being matched with the angle information. For example, a difference between the start point angle of the word and the angle of the start point that is the actually inputted may be calculated; when said difference is within the predetermined angle threshold range, the word is a word with a matched start angle.

In another specific embodiment, a length of the actual movement trajectory of the sensing apparatus may also be obtained from said input information, and words having a matched movement trajectory length are searched out from the lexicon. Wherein, a predetermined length threshold range may be set, and when a corresponding trajectory length of a word in the feature lexicon is different from the actual movement trajectory length no more than the predetermined length threshold range, it is considered as being matched with the actual movement trajectory length. For example, a difference between the trajectory length of the word and the actual movement trajectory length may be calculated; when said difference is within the predetermined length threshold range, the word is a word with a matched trajectory length.

In another specific embodiment, the trajectory length and the angle information can be combined, and then be used to make rough screening in the feature lexicon. For example, a first rough screening may be performed according to the trajectory length, and then a second screening may be performed according to the angle information after the first rough screening; thus, the rough screened word set is obtained according to the screening result. Alternatively, the order of those two screening operations may be switched, i.e., the first rough screening is firstly performed according to the angle information, and then a screening operation is performed according to the trajectory length. Alternatively, when the feature lexicon is configured, an index sequence is created for the words according to the trajectory length or the angle information, and words are searched according to the angle information or the trajectory length, so that the rough screened word set is obtained.

The angle information or the trajectory length of a specified position is used as the feature information, and the rough screening operation is performed in the feature lexicon, so that requirements on device size are lowered and requirements on the consistency of the actually inputted trajectory are lowered. Thus, robustness against the user's error sliding operation and the system's false identification is enhanced, and accuracy of identification is greatly improved.

In another embodiment of the present invention, the input information recorded in the step S1 includes the feature information such as the angle information, the movement trajectory length and so on, and the step S2 extract from it, so that the necessary, related feature information may be obtained. Wherein, the step S2 may extract all the feature information with respect to the movement trajectory of the sensing apparatus, and processes these feature information; also the step S2 may only process a predetermined number of the feature information such as the angle information, the trajectory length and so on; for example, after the feature information is extracted according to all the input information, a predetermined number of the feature information is used to perform subsequent operations such as searching and screening. Wherein, the predetermined number may be 75%-95% of all the data. Training of huge data demonstrates that, the feature information corresponding to 85% of the input information is enough for realizing a well balance between accuracy and computation amount, so that while the accuracy is not affected, the amount of the data to be computed is reduced and requirements on device hardware is lowered, the processing efficiency is improved, and a faster, more accurate input experience is brought to the user.

Figure 7:
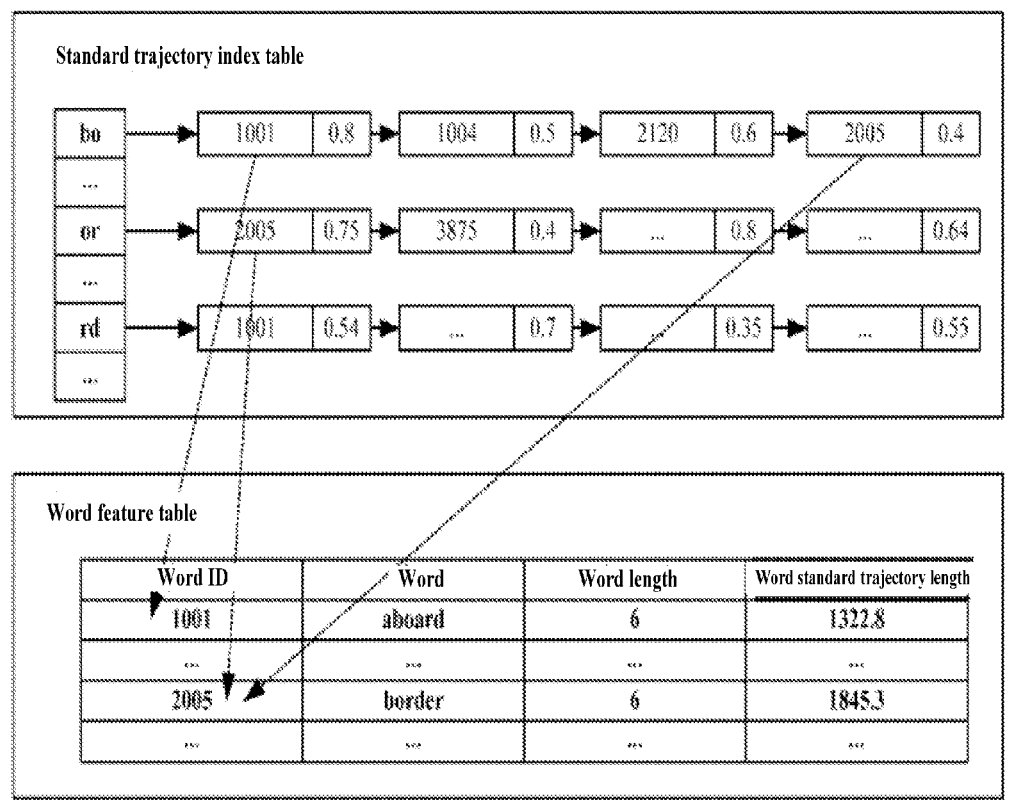
FIG. 7 is a schematic diagram of logical storage structure of the feature lexicon used in an embodiment of a method for text input by a continuous sliding operation of the present invention.

Additionally, it also may comprise configuring the feature lexicon, and this step is not an essential step of the method of the present invention. Any other process method that can achieve the same or corresponding technical effect may be employed. Specifically, the feature lexicon is a word lexicon created by making respective feature information as index. During the configuration process, standard feature information corresponding to the word in the lexicon may be extracted and is stored into the feature lexicon module. For example, corresponding to the angle in the feature information, ideal angle information corresponding to the word in the lexicon may be extracted; corresponding to the movement trajectory length in the feature information, standard trajectory length corresponding to the word in the lexicon may be extracted. In one embodiment, the configured feature lexicon may comprise a word feature table and a word standard trajectory index table. Fields in said word feature table may comprise a word mark and word content, and it may also comprise at least one of a standard trajectory length and standard angle information, said word standard trajectory index table refers to the word mark in the word feature table. Such word standard trajectories may be a large number of similar trajectories of corresponding words extracted according to a lot of training data from the sliding trajectory of the user. Alternatively, such word standard trajectories may be the straight lines connecting center points of successive letters of words on the screen software keyboard. The logical storage structure of the finished feature lexicon is shown in FIG. 7. Here, the lexicon may be stored in existing small-sized database, and may also be stored by a designed, specific storing method so as to optimize the access speed of the data and the used storage space.

A step S3: processing said input information, and filtering the rough screened word set obtained in the step S2 according to the process result. Wherein, the operation of processing said rough screened word set may further include performing a rough filtering operation and a fine filtering operation on it.

As mentioned above, since the angle information is used to search so as to obtain the rough screened word set, the number of words contained therein is always large. The inventor found out that, if the similarity is calculated and matched word by word with respect to the rough screened word set, not only a great quantity resource is consumed, but also time spent on computation is relatively long. Thus, the inventor firstly performs the rough filtering operation on the input information, and then the fine filtering operation is performed according to result of the rough filtering operation; thus, resource is saved and calculation efficiency is enhanced.

Specifically, during the rough filtering operation, envelope algorithm is used to calculate with respect to each word in the word set obtained by rough screening, the distance between its actual trajectory and standard trajectory, and filtering operation is conducted according to the distance obtained by such calculation, so as to obtain the rough filtered word set.

In one embodiment, the following steps may be used to calculate the distance. First of all, according to the actual movement trajectory of each word, an envelope of the word is calculated. Specifically, an upper envelope and a lower envelope of each point in the actual movement trajectory are respectively calculated. In a specific embodiment, referring to FIG. 8, first of all, according to the input information, the horizontal coordinate or the vertical coordinate of each point in the actual movement trajectory of the sensing apparatus is extracted. Next, with respect to the horizontal coordinate or the vertical coordinate of each point in the actual movement trajectory, its corresponding upper envelope value and the lower envelope value are calculated.

Specifically, in terms of the horizontal coordinate or the vertical coordinate, the N-th point is compared with its preceding or its subsequent predetermined number of points; the maximum value is selected as the upper envelope value of the N-th point, and the minimum value is selected as the lower envelope value of the N-th point.

For example, the N-th point is compared with its preceding i points (i.e. the N−i-th point, . . . , the N−1-th point) and its subsequent i points (i.e. the N+1-th point, . . . , the N+i-th point), in terms of the horizontal coordinate;

XupperboundN=Xmax{N−i, . . . , N−1, N, N+1, . . . , N+i},

XlowerboundN=Xmin{N−i, . . . , N−1, N, N+1, . . . , N+i};

Further, the N-th point is compared with its preceding i points (i.e. the N−i-th point, . . . , the N−1-th point) and its subsequent i points (i.e. the N+1-th point, . . . , the N+i-th point), in terms of the vertical coordinate:

YupperboundN=Ymax{N−i, . . . , N−1, N, N+1, . . . , N+i},

YlowerboundN=Ymin{N−i, . . . , N−1, N, N+1, . . . , N+i}.

Wherein, when N<i and N>j, wherein j stands for any natural number between 1 to i, the horizontal coordinate or the vertical coordinate of the N−i-th point, . . . , the N−j−1-th point may be evaluated according to the movement trajectory. Alternatively, when the trajectory includes M points and N+i>M while N+j<M, wherein j stands for any natural number between 1 to i, the horizontal coordinate or the vertical coordinate of the N+j+1-th point, . . . , the N+i-th point may be evaluated according to the movement trajectory.

Figure 8:
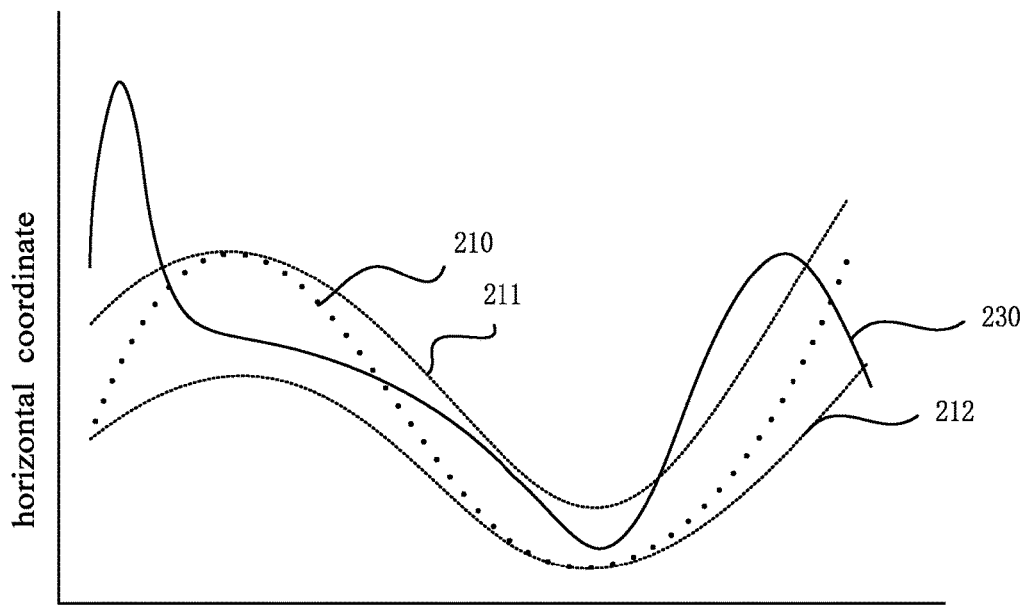
FIG. 8 is a schematic diagram for explaining the calculation of the horizontal-coordinate distance of the actual movement trajectory in an embodiment of a method for text input by a continuous sliding operation of the present invention.

Referring to FIG. 8, after all the points in the actual movement trajectory are traversed, the upper envelope 211 and the lower envelope 212 relative to the horizontal coordinate 210 of the entire movement trajectory, as well as the upper envelope and the lower envelope relative to the vertical coordinate of the entire movement trajectory, are respectively obtained.

Next, the first standard trajectory of each word is calculated. Wherein, when the first standard trajectory of each word is calculated, the first standard trajectory is calculated according to a sampling frequency of the actual movement trajectory, so that the number of sampling points of the first standard trajectory to be obtained are equal to the number of sampling points of the actual movement trajectory, and fitting is operated on such basis, so as to obtain the first standard trajectory.

In other embodiments, the first standard trajectory of each word may be calculated firstly; alternatively, in case that the actual operational capability is sufficient, the calculation of the first standard trajectory and the calculation of the distance may be simultaneously operated on multiple processors.

Next, according to the first standard trajectory of each word and its envelope, its distance is calculated. Specifically, referring to FIG. 8, when the distance is calculated, the horizontal coordinate 210 of the first standard trajectory of the word is respectively compared with the horizontal coordinate envelopes (i.e. the upper envelope 211 and the lower envelope 212) of its corresponding actual movement trajectory, and the sum of exserted envelopes on the horizontal coordinate of the first standard trajectory is calculated; also, the vertical coordinate of the first standard trajectory of the word is compared with the vertical coordinate envelopes (i.e. the upper envelope and the lower envelope) of its corresponding actual trajectory, and the sum of exserted envelopes on the vertical coordinate of the first standard trajectory is calculated. Then, a sum of those two are calculated, and is used as the distance of the word.

Finally, according to the calculated distance, they are sequenced according a order from small to large, first predetermined number of words are selected, so as to obtain the rough filtered word set. Wherein, the predetermined number can be set according to the actual operational capability of the mobile terminal, for example, the predetermined number may be dozens to thousands.

Figure 9:
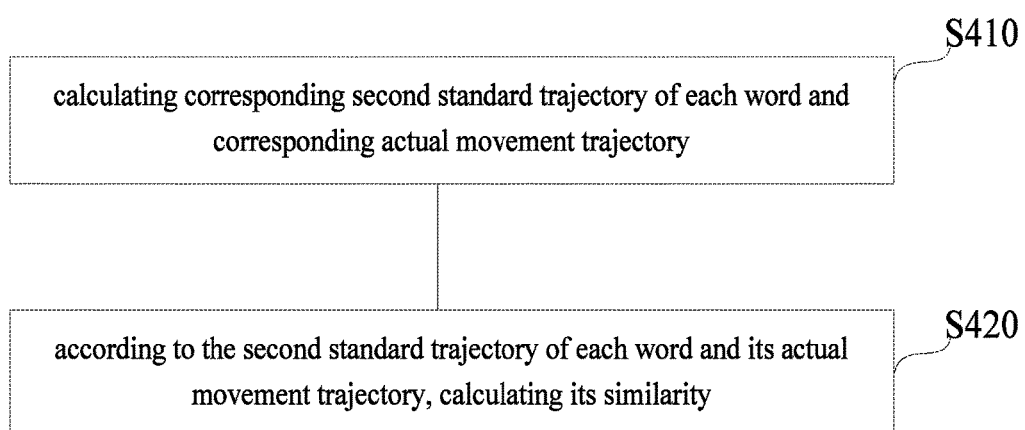
FIG. 9 is a schematic diagram for explaining the calculation of the similarity between the standard trajectory of each word and its actual trajectory the similarity in an embodiment of a method for text input by a continuous sliding operation of the present invention.

Next, as for each word in the rough filtered word set, the fine filtering operation is conducted, i.e. respectively calculating the similarity between its standard trajectory and the actual trajectory. Specifically, referring to FIG. 9, the process of calculating the similarity between standard trajectory of each word and its actual trajectory, can employ the following steps:

First of all, the step S410: calculating corresponding second standard trajectory of each word and corresponding actual movement trajectory. Wherein, process may performed according to said input information or on said input information, so as to calculate the second standard trajectory corresponding to each word; for example, the trajectory point sequence corresponding to the second standard trajectory may be obtained by means of up-sampling.

Next, the step S420, according to the second standard trajectory of each word and its actual movement trajectory, the similarity is calculated.

In a specific embodiment, for example, it may comprise:

(i) as for each point s[i] in said the trajectory point sequence, distances between all the points t[j] in the second standard trajectory and such point s[i] are summed up according to the following formula, and the similarity distance D[i, j] is obtained:

$$D[i,j]=cost+\min(D[i-1,j],D[i,j-1],D[i-1,j-1]);$$

Wherein, cost=distance (s[i], t[j]). Also, distance (s[i], t[j]) is a distance between two points of s[i] and t[j], D[0, 0]=0, i=1, 2, 3, . . . , n, wherein n is the total number of points in the trajectory point sequence of the user; j=1, 2, 3, . . . , m, wherein m is the total number of points in standard trajectory; min (D[i−1, j], D[i,j−1], wherein D [i−1, j−1]) is the minimum value of D[i−1, j], D[i, j−1] and D[i−1, j−1];

(ii) above step (i) is repeated, until all the points in said second standard trajectory is traversed, and the similarity distance D[n, m] between standard trajectory and the actual trajectory is obtained by cumulative calculation;

Wherein, above similarity distance is the similarity between the standard trajectory feature of such word and the actual trajectory.

Next, the step S4 is executed, for further sequencing and then outputting the candidate word set obtained by filtering. Specifically, after the similarity of each candidate word, calculation is further made by weighting in connection with a priority level of the candidate word, environmental word information of the candidate word, the input history information of the candidate word and the fact about whether the candidate word is a expected result and the like, so as to obtain a score of the candidate words; finally, the candidate word set after fine screening is sequenced according to the score, the candidate words are sequentially outputted to the interactive apparatus according to the sequence, enabling feeding back to the input of the user.

In a system for text input by a continuous sliding operation according to the present invention, the interactive apparatus 110 may at least comprise an input device (for example, a touch sensitive input device and contactless sensitive input device) suitable for the user to perform sliding input, and an output device (for example a video output device, an audio output device and so on) for feeding the input result back to the user. Wherein, the input device and the output device may be integrated together; for example, the interactive apparatus 110 may be a touch screen integrated with a software keyboard. Additionally, the input device may also be separated from the output device; for example, the user perform input operation on a touchpad, and its output is fed back to the user via an audio output device, or its output is displayed by a display that is separated from the touchpad.

Specifically, the interactive apparatus 110 may also detect and record the input of the user; for example, it may detect whether it contacts the sensing apparatus manipulated by the user. When such contact exists, the position where the interactive apparatus 110 contacts the sensing apparatus is recorded, and whether the sensing apparatus is moving or not is detected; when it is detected that the sensing apparatus is moving, the operation of recording position of the sensing apparatus continues; when it is detected that the sensing apparatus stops moving, whether the sensing apparatus 110 stops contacting the interactive apparatus or not is detected, and the position of the sensing apparatus and the time that the sensing apparatus stays at such position are recorded. When the time that the sensing apparatus stays exceeds the predetermined time threshold, words corresponding to the input trajectory are outputted. During above detection process, when it is detected that the sensing apparatus stops contacting the interactive apparatus, a corresponding word set is obtained according to the input information, and the obtained word is outputted to the user.

In another embodiment of the present invention, the interactive apparatus 110 may also pre-process the input information. For example, the input information may be up-sampled; also, for example, the input information may be smoothed. Since noise points may be generated in the data of the sliding trajectory due to some reasons such as the fact that the hand trembles when the user is performing input operation, a series of pre-processing operations may be performed on the input information. For example, it may comprise eliminating the difference of sizes of the trajectories caused by the difference of sizes of cell phone touch screen by means of size normalization; it may comprise eliminating the noise points in the data of the sliding trajectory caused by reasons such as hand trembling, by means of the trajectory smoothing process (for example smoothing the trajectory by means of mean filter and the like); it may also comprises processes such as normalizing dot pitches.

In yet another embodiment of the present invention, the interactive apparatus 110 may also further process the input information. For example, corresponding angle information may be calculated according to the position of the sensing apparatus; also, the actual movement trajectory length of the sensing apparatus may be calculated according to the position of the sensing apparatus. When the angle information and the actual movement trajectory length are calculated, the calculation may be based on the input trajectory that is not pre-processed, smoothed input trajectory, or up-sampled input trajectory; the angle information or the actual movement trajectory length may be respectively calculated according to different input information; for example, the calculation of the angle information may be based on smoothed input trajectory, and the calculation of the movement trajectory length may be based on up-sampled input trajectory.

In yet another embodiment of the present invention, the interactive apparatus 110 may also perform process based on the input information, and extracts predetermined number of the obtained feature information, for subsequent process. In one embodiment, for example, after corresponding feature information is calculated according to the input information, 75%-95% of the feature information is extracted for subsequent process. In a specific embodiment, the interactive apparatus 110 employs feature information corresponding to 85% of the input information, realizing a well balance between accuracy and computation amount, so that a faster, more accurate input experience is brought to the user.

In other embodiments, the interactive apparatus 110 may record the input information and transfers the recorded input information to the processor 120; alternatively, the interactive apparatus 110 may record and pre-process the input information and transfers pre-processed input information to the processor 120. The processor 120 receives the input information or the pre-processed input information, and extracts corresponding feature information. Wherein, the processor 120 may extract corresponding feature information according to all the input information, and may also extract the feature information according to a predetermined number of the input information; for example, it may extract feature information corresponding to 75%-95% of the input information, especially 85% of the input information.

When the processor 120 has obtained the feature information, the processor 120 searches the feature lexicon, so as to find out words matched with the feature information, so that the rough screened word set may be obtained; then, the processor 120 further performs a rough filtering operation on the rough screened word set according to the input information, and then perform a fine filtering operation.

In an embodiment of the present invention, it may also comprise the memory 140, suitable for storing the feature lexicon, and the word sets that are screened or filtered. The memory 140 may also be suitable for storing computer program for implementing the present invention. Wherein, the memory 140 may comprise one or more magnetic storage medium, such as hard disk; one or more optical storage medium such as Compact Disc (CD), CD-ReWritable (CD-Rs), repeated erasable Compact Disc (CD±RWs), DVDs, erasable DVD (DVD±Rs), repeated erasable DVD (DVD±RWs), blue light DVD; one or more semiconductor storage medium, such as Flash Memory, SD card, memory stick, or other suitable computer readable medium.

Figure 10:
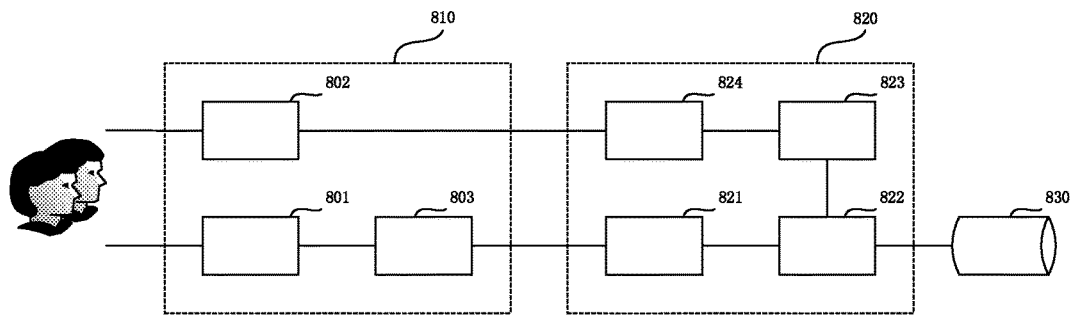
FIG. 10 is a schematic diagram of an embodiment of a system for text input by a continuous sliding operation of the present invention.

Referring to FIG. 10, such Figure is a schematic diagram of an embodiment of a system for text input by a continuous sliding operation of the present invention. Wherein, the interactive apparatus 810 may comprise: the input module 801, suitable for receiving sliding inputs of the sensing apparatus; the output module 802, suitable for feeding output results back to the user; the input information recording module 803, suitable for detecting the inputs of the sensing apparatus and recording the input information.

the processor 820 may comprise: the feature information obtaining module 821, suitable for obtaining feature information such as the angle information and the actual movement trajectory length, from the recorded input information; the rough screening module 822, suitable for searching the feature lexicon 830 for matched words according to said feature information such as the angle information and the trajectory length, so as to obtaining the rough screened word set; the rough filtering module 823, suitable for calculating with respect to each word of the rough screened word set, the distance between its actual movement trajectory and standard trajectory, by envelope algorithm, and filtering according to said distance so as to obtain a rough filtered word set; the fine filtering module 824, suitable for calculating with respect to each word of the rough filtered word set, the similarity between its standard trajectory and the actual movement trajectory, and sequencing the words obtained by fine filtering, and outputting the words to the output module 802 according to said sequencing.

Wherein, In one embodiment, the input information recording module 803 may also be suitable for pre-processing such as smoothing (for example up-sampling) the recorded input information, and output the pre-processed input information to the processor 820. In another embodiment, the input information recording module 803 only record the input information, and the feature information obtaining module 821 pre-processes the input information, extracts the feature information such as the angle information and the trajectory length according to pre-processed result, and transfers the pre-processed result to the rough screening module 822, the rough filtering module 823 and the fine filtering module 824.

Figure 11:
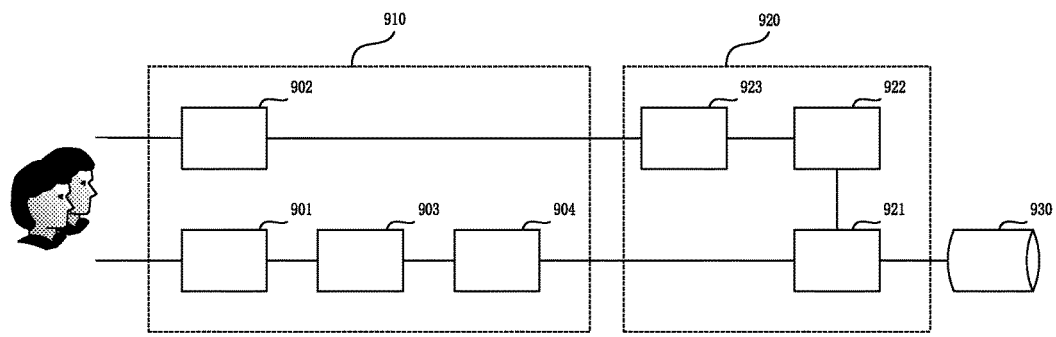
FIG. 11 is a schematic diagram of another embodiment of a system for text input by a continuous sliding operation of the present invention.

Referring to FIG. 11, which is a schematic diagram of another embodiment of a system for text input by a continuous sliding operation according to the present invention. The extracting operation of the feature information is realized by the interactive apparatus 910, wherein the interactive apparatus 910 may comprise the feature information obtaining module 904. The interactive apparatus 910 transfers the feature information and the input information to the processor 920, and subsequent screening operation and filtering operation are realized by the rough screening module 921, the rough filtering module 922 and the fine filtering module 923 of the processor 920, so that the candidate words are obtained, the interactive apparatus 910 sequences the candidate words based on a predetermined rule, and feeds sequenced words back to the user.

In the following, in connection with the system and method disclosed in the present invention, taking the standard trajectory of the word "quick" and the trajectory that is inputted by the user via a sliding operation as example, the concept of the present invention will be explained.

In an implementing process, the process is as follows:

(1) when the user's finger or the sensing apparatus starts sliding from a point near a key "q", the interactive apparatus records the position information and the angle information when such sliding starts;

(2) the user's finger or the sensing apparatus slides on the keyboard, the interactive apparatus continues to record the position information of the finger or the sensing apparatus;

(3) when the finger or the sensing apparatus is lifted or stays at a position near a key "k" for a time interval that exceeds a predetermined time threshold, the interactive apparatus records the position information and the angle information when the finger or the sensing apparatus stops sliding, and calculates the sliding trajectory length until the finger or the sensing apparatus stops sliding;

(4) the interactive apparatus transfers the recorded position information, angle information and the sliding trajectory length to the processor, and the processor performs matching process on the movement trajectory of the user according to said position information, the angle information and the sliding trajectory length.

In another implementing process, the matching process is as follows:

(21) when the user's finger or the sensing apparatus starts sliding from a point near a key "q", the interactive apparatus records the position information when such sliding starts;

(22) the user's finger or the sensing apparatus slides on the keyboard, the interactive apparatus continues to record the position information of the finger or the sensing apparatus;

(23) when the finger or the sensing apparatus is lifted or stays at a position near a key "k" for a time interval that exceeds a predetermined time threshold, the interactive apparatus records the position information when the finger or the sensing apparatus stops sliding;

(24) the interactive apparatus transfers the recorded position information to the processor, and the processor calculates the angle information of the start position and the end position, calculates the sliding trajectory length until the finger or the sensing apparatus stops sliding, and performs matching process on the movement trajectory of the user according to the position information, the angle information and the sliding trajectory length.

In another implementing process, the matching process is as follows:

(31) when the user's finger or the sensing apparatus starts sliding from a point near a key "q", the interactive apparatus records the position information and the angle information when such sliding starts;

(32) the user's finger or the sensing apparatus slides on the keyboard, the interactive apparatus continues to record the position information of the finger or the sensing apparatus;

(33) when the finger or the sensing apparatus is lifted or stays at a position near a key "k" for a time interval that exceeds a predetermined time threshold, the interactive apparatus records the position information and the angle information when the finger or the sensing apparatus stops sliding, and calculates the sliding trajectory length until the finger or the sensing apparatus stops sliding;

(34) the interactive apparatus transfers the angle information of the start position, the sliding trajectory length and a predetermined number of the position information to the processor, and the processor performs matching process on the movement trajectory of the user according to the received angle information, position information and sliding trajectory length.

In above description of the present invention, it is demonstrated how to input an English word by sliding input. In fact, the method for text input by a continuous sliding operation of the present invention also supports other kinds of languages, and is not limited to the keyboard layout. Languages supported by such method for inputting text by sliding input include but are not limited to Western languages (English, French, German and so on), Latin (Spanish, Portuguese and so on) and Asian language (Arabic, Dard, Chinese, Japanese, Korean and so on). On the keyboard layout, such method for inputting text by sliding input supports the most popular QWERTY keyboard layout, AZERTY keyboard layout that is commonly used in French, and other keyboard layouts.

Compared with the prior art, the present invention screens in the feature lexicon according to the angle information and the trajectory length inputted by the user, and uses envelops to perform rough filtering and further calculates the similarity to finish fine filtering; so that the candidate words is obtained; and harmful effects that may be brought by the user's misoperations and system's misjudgment is effectively diminished. The amount of data computation is reduced, and the power is saved, which brings the user an input experience that is more convenient and fast. Additionally, the present invention can effectively improve the speed and accuracy of the input of word, and obviously reduce complexity of the user's operation. The implementation procedure is simple, and the application is convenient and fast, computation complexity is low. The present invention is suitable for realizing a system of inputting a word by sliding operation based on a software screen keyboard on a broad range of electronic equipments.

In this Description, the present invention is described with reference to specific embodiments. However, obviously, various modifications and variations can be made without departing the spirit and scope of the present invention. Thus, the Description and the Figures are only used as illustrative explanation of the present invention, rather than limitation to inventive concept of the present invention.

The invention claimed is:

1. A method for text input by a continuous sliding operation, the method comprising:

detecting, via an interactive apparatus, an input movement trajectory of a sensing apparatus, and recording input information, wherein the input information comprises information for a start point or an end point of the input movement trajectory, and at least one sampling point along the input movement trajectory;

obtaining feature information, via a processor, from the input information, wherein the feature information is chosen from one or more of a movement trajectory length, a start point angle of the input movement trajectory, or an end point angle of the input movement trajectory;

searching, via the processor and regardless of a position of the start point or a position of the end point of the input movement trajectory, a feature lexicon according to the feature information, and selecting matched words to form a rough screened word set, wherein the matched words have a start point angle within a predetermined angle threshold value of the start point angle of the input movement trajectory;

according to an actual movement trajectory of a word in the rough screened word set, calculating, via the processor, a distance between the actual movement trajectory and a first standard trajectory corresponding to the word, and filtering each word in the rough screened word set according to the calculated distance so as to obtain a rough filtered word set;

calculating, via the processor, a similarity distance between the actual movement trajectory of a word in the rough filtered word set and its corresponding second standard trajectory, and filtering each word in the rough filtered word set according to the calculated similarity distance to obtain a fine filtered word set;

sequencing, via the processor, each word of the fine filtered word set; and outputting a candidate word set according to the sequencing.

2. The method according to claim 1, the method further comprising:
when it is detected that the sensing apparatus is contacted with an interactive apparatus and moves with respect to the interactive apparatus, recording the angle information when the sensing apparatus moves; and
when it is detected that the sensing apparatus is contacted with an interactive apparatus and moves with respect to the interactive apparatus, recording the actual movement trajectory length of the sensing apparatus.

3. The method according to claim 1, wherein the recording input information further comprises:
when it is detected that the sensing apparatus is contacted with an interactive apparatus, recording a start position of the movement of the sensing apparatus;
when it is detected that the sensing apparatus moves, continuing to record positions of the sensing apparatus;
when it is detected that the sensing apparatus stops moving, recording the time that the sensing apparatus stays at the stop position; and
when it is detected that the sensing apparatus stops moving, recording the position of the sensing apparatus and detecting whether the sensing apparatus has left the interactive apparatus.

4. The method according to claim 1, wherein the obtaining feature information from the input information further comprises:
calculating the angle information or the actual movement trajectory length or combination thereof of a specified position of the sensing apparatus according to the input information;
calculating corresponding feature information according to a predetermined number of input information;
extracting a predetermined number of the feature information with respect to the movement trajectory of the sensing apparatus, from the feature information obtained by calculating the input information.

5. The method according to claim 1, wherein the calculating a distance of the word in the rough screened word set further comprises:
calculating respectively an upper envelope and a lower envelope according to the actual movement trajectory of the word;
calculating the first standard trajectory according to a sampling frequency of the actual movement trajectory;
calculating respectively a first sum of exserted envelopes on a horizontal coordinate and a second sum of exserted envelopes on a vertical coordinate of the first standard trajectory; and
summing up those the first and the second sums to obtain the distance of the word.

6. The method according to claim 1, wherein the calculating the similarity distance of the word in the rough filtered word set further comprises:
according to the input information, obtaining the second standard trajectory of the word;
according to each trajectory point on the actual movement trajectory of the word, calculating a similarity distance of the trajectory point between the trajectory point on the actual movement trajectory and the corresponding trajectory point on the second standard trajectory; and
summing up the similarity distances for all trajectory points in the second standard trajectory to obtain the similarity distance of the word.

7. The method according to claim 6, wherein the sequencing the words according to the similarity distance further comprises:
weighing the similarity distance of the word with a priority level of the word, environmental word information of the word, input history information of the word and a fact about whether the word is an expected result, so as to obtain a score of the word, and sequencing the words according to the score.

8. The method according to claim 1, wherein the method further comprises pre-processing the input information.

9. A system for text input by a continuous sliding operation, comprising:
an interactive apparatus;
a processor for processing information from the interactive apparatus; and
a storage for storing data; and
wherein the interactive apparatus is configured to:
detect the sliding inputs of a sensing apparatus;
record input information of the sensing apparatus, the input information comprises information for a start point or an end point of an input movement trajectory, and at least one sampling point along the input movement trajectory; and
provide the recorded input information to the processor for processing, and
wherein the processor is configured to:
obtain feature information from the recorded input information, wherein the feature information is chosen from one or more of the movement trajectory length, a start point angle of the input movement trajectory, or an end point angle of the input movement trajectory;
search a feature lexicon, regardless of a start position or an end position of the input movement trajectory, for matched words according to the feature information to obtain a rough screened word set, wherein each word of the rough screened word set has an angle information that matches with the angle information in the feature information;
calculate with respect to a word of the rough screened word set, a distance between its actual movement trajectory and a first standard trajectory, and filter according to the calculated distance to obtain a rough filtered word set;
calculate with respect to a word of the rough filtered word set, a similarity distance between its actual movement trajectory and a second standard trajectory, filter according to the calculated similarity distance to obtain a fine filtered word set; and
sequence each word of the fine filtered word set, and output a candidate word set according to the sequencing.

10. The system according to claim 9, wherein:
when it is detected that the sensing apparatus is contacted with the interactive apparatus and moves with respect to the interactive apparatus, the interactive apparatus records the angle information when the sensing apparatus moves; and
when it is detected that the sensing apparatus is contacted with an interactive apparatus and moves with respect to the interactive apparatus, the interactive apparatus records the actual movement trajectory length of the sensing apparatus.

11. The system according to claim 9, wherein:
when it is detected that the sensing apparatus is contacted with the interactive apparatus, the interactive apparatus records a start position of the movement of the sensing apparatus;
when it is detected that the sensing apparatus moves, the interactive apparatus continues to record positions of the sensing apparatus;
when it is detected that the sensing apparatus stops moving, the interactive apparatus records a time that the sensing apparatus stays at the stop position; and
when it is detected that the sensing apparatus stops moving, the interactive apparatus records a position of the sensing apparatus and detects whether the sensing apparatus has left the interactive apparatus.

12. The system according to claim 9, wherein the processor is further configured to:
calculate angle information or the actual movement trajectory length or combination thereof of a specified position of the sensing apparatus according to the input information;
calculate corresponding feature information according to a predetermined number of input information; and
extract a predetermined number of the feature information with respect to the movement trajectory of the sensing apparatus, from the feature information obtained by calculating the input information.

13. The system according to claim 9, wherein the processor is further configured to:
calculate respectively an upper envelope and a lower envelope according to the actual movement trajectory of a word of the rough screened word set, and calculate a first standard trajectory according to a sampling frequency of the actual movement trajectory; and
calculate respectively a first sum of exserted envelopes on a horizontal coordinate and a second sum of exserted envelopes on a vertical coordinate of the first standard trajectory, and summing up the first and the second sums to obtain a distance of the word.

14. The system according to claim 9, wherein the processor is further configured to:
obtain a second standard trajectory of a word of the rough filtered word set according to the input information;
according to each trajectory point on the actual movement trajectory of the word, calculate a similarity distance between it and a corresponding trajectory point on the second standard trajectory until all the trajectory points in the second standard trajectory are traversed; and
summing up the similarity distances for all the trajectory points to obtain the similarity distance of the word.

15. A system for text input by a continuous sliding operation, comprising:
an interactive apparatus, suitable for receiving sliding inputs of a user, detecting and recording input information of the user, and feeding input results back to the user;
a processor that performs the following operations:
obtaining feature information including a movement angle and an actual movement trajectory length from the recorded input information;
searching a feature lexicon according to the feature information, and, regardless of a start point position of an input movement trajectory or an end point position of the input movement trajectory, selecting words that have matching angle information, or a matching movement trajectory length, or both, as matched words to obtain a rough screened word set;
calculating with respect to the actual movement trajectory of each word of the rough screened word set, a distance between its actual movement trajectory and a first standard trajectory corresponding to the word, and filtering words according to the calculated distance so as to obtain a rough filtered word set;
calculating a similarity distance between the actual movement trajectory of each word in the rough filtered word set and its corresponding second standard trajectory; and
sequencing the words according to the calculated similarity distance, and outputting the words to the user according to the sequencing.

16. The system according to claim 15, further comprising:
a memory, suitable for storing the feature lexicon, screened or filtered word sets, and computer program operated by running the processor.

17. The system according to claim 15, wherein the conditions further include their movement trajectory length is matched with movement trajectory length in the feature information.

* * * * *